United States Patent [19]
Choate

[11] Patent Number: 5,835,972
[45] Date of Patent: *Nov. 10, 1998

[54] METHOD AND APPARATUS FOR OPTIMIZATION OF DATA WRITES

[75] Inventor: Michael L. Choate, Round Rock, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 654,437

[22] Filed: May 28, 1996

[51] Int. Cl.⁶ ............................... G06F 12/00
[52] U.S. Cl. .................. 711/220; 711/217; 711/218; 711/211; 711/202; 711/134; 711/214
[58] Field of Search ..................... 395/287, 307, 395/421.01, 250, 453, 855, 308, 3.8; 711/211, 125, 220, 214

[56] References Cited

U.S. PATENT DOCUMENTS

| | | |
|---|---|---|
| 5,185,694 | 2/1993 | Edenfield et al. ............ 395/287 |
| 5,255,378 | 10/1993 | Crawford et al. ............ 395/307 |
| 5,261,064 | 11/1993 | Wyland ............ 395/421.01 |
| 5,459,842 | 10/1995 | Begun et al. ............ 395/250 |
| 5,561,780 | 10/1996 | Glew et al. ............ 395/453 |
| 5,579,530 | 11/1996 | Solomon et al. ............ 395/855 |
| 5,581,714 | 12/1996 | Amini et al. ............ 395/308 |

*Primary Examiner*—Tod R. Swann
*Assistant Examiner*—Fred F. Tzeng
*Attorney, Agent, or Firm*—Rita M. Wisor

[57] ABSTRACT

An improved method for performing memory writes from a processor in a personal computer system is provided whereby single writes are combined into burst writes based on detection of suitable write operations in instruction code. In a preferred embodiment, the improved method is implemented in microcode. The method includes detecting multiple suitable write operations prior to the execution, collecting the data elements in a storage unit, and writing the data elements as burst write operations. Write operations that meet specific conditions for quantity of data elements to be written and specific conditions for destination address are suitable for bursting. The improved method can be implemented in existing personal computers, thereby improving system performance without requiring new software applications or a new computer board design.

17 Claims, 6 Drawing Sheets

METHOD AND APPARATUS FOR OPTIMIZATION OF DATA WRITES

DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to processor design for a personal computer system and more particularly to memory access techniques for optimizing bus usage by generating burst write operations.

2. Background

A personal computer system typically consists of a processor, memory, and various input and output (I/O) devices or peripherals. A bus connects the memory to the processor. The processor stores or writes data in memory by activating preselected control signals and placing a destination address and the corresponding data on the bus. The processor fetches or reads data from memory by activating preselected control signals and placing a source address on the bus. The memory responds by placing the corresponding data on the bus.

The memory typically consists of both cache memory and main memory. Cache memory provides faster access and is typically smaller in size than main memory. Main memory typically shadows or contains a copy of the data in cache memory as well as other data. The processor typically contains cache memory. Cache memory internal to the processor is referred to as Level One (L1) cache, and provides faster access and is typically smaller than Level Two (L2) cache. L2 cache is typically external to the processor.

Figure 1:
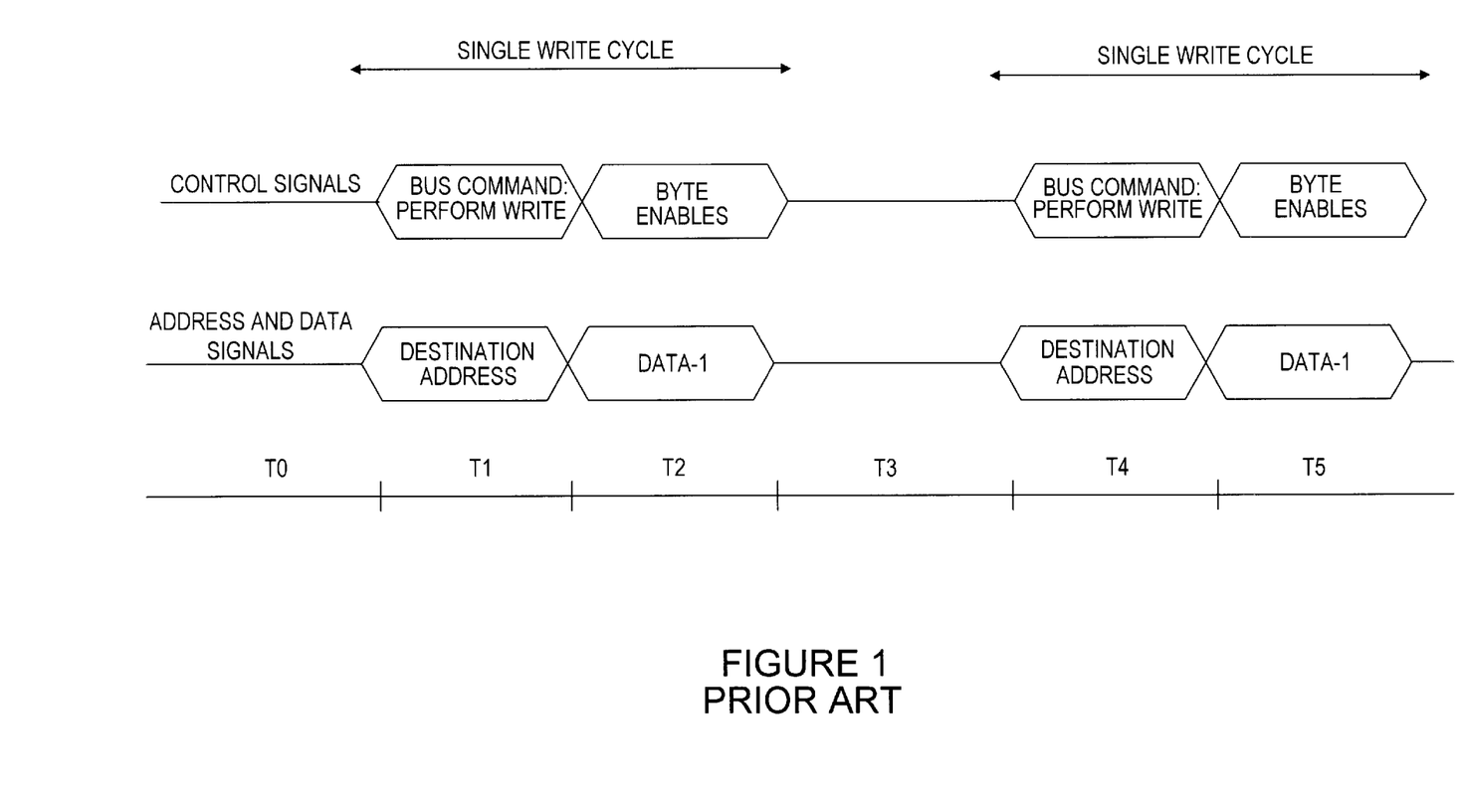
FIG. 1 is a diagram showing typical prior art single write operations.

Processor writes to memory are typically one of two types: single write operations and burst write operations. Referring to FIG. 1, typical prior art single write operations are shown. A single write operation is a bus cycle where the destination address is placed on the bus followed by the data to be written. The data to be written is typically a byte (8 bits), a word (16 bits), or a double word (32 bits) limited by the width of the bus and the amount of data to be written.

Current burst capabilities in a processor are used only during cache coherency and management operations, such as flushing the cache and cache line fills. The programmer has no tools by which to access burst capabilities. Burst operations are not a function of normal instruction stream processing and are not normally used by the programmer.

Some processor designers are providing new burst instructions which can be used by the programmer. However, these new instructions would be available only to new software applications, and require old applications and compilers to be rewritten.

Figure 2:
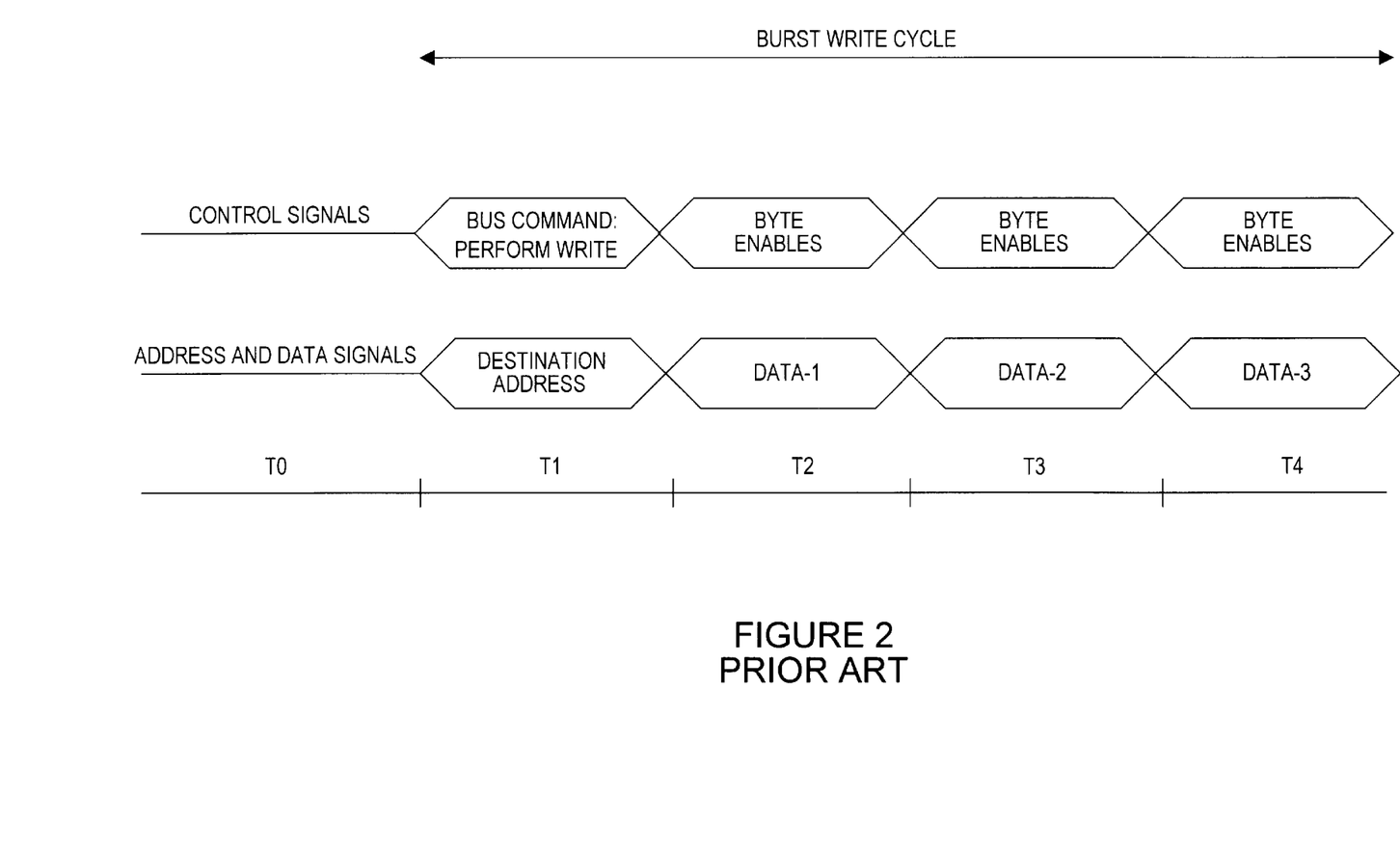
FIG. 2 is a diagram showing a typical prior burst write operation.

Referring to FIG. 2, a typical prior art burst write operation is shown. A burst write operation is a bus cycle where the destination address is placed on the bus followed by multiple data to be written. The data to be written is multiple bytes, words or double words during multiple data phases or time slots (labeled T2, T3, and T4). The data from the first data phase (T2) is written to the given destination address. Subsequent data from the following phases (T3, T4) are written to an offset of the given address based on the data size and the particular bus burst protocol. Existing burst write bus protocols handle data that is typically in increasing address order and sometimes restricted in size to the size of a cache line. On some busses, the burst write protocol handles data operands with not completely sequential destination addresses. This is done for example by not asserting byte enables for the skipped addresses and data or by employing known bus bursting algorithms and protocols.

Burst operations increase the performance of computer systems by compacting data transfers from several small transfers or several single transfers into one long transfer. Due to the need to repetitively supply destination addresses and wait states for each operation, single write operations almost double the usage of the bus, slowing access time and decreasing overall performance of the computer system.

Sometimes a processor is connected to external memory through a bus bridge. The bus bridge contains a memory controller and converts the processor bus (also known as processor local bus) signals to memory bus signals. The bus bridge also connects a peripheral bus to both the processor and memory busses. Existing bus bridges handle burst operations by transferring a burst operation from one bus to another, but typically not generating these burst operations itself. The ability to create burst operations from single operations is being added to newer bus bridges. The newer bridge monitors bus transfers and if sequential in address, groups them together and performs a burst transfer. These burst transfers are not a function of the instruction stream written by a software programmer and are therefore haphazard and not controllable. The bridge must monitor all transfers, buffering all transfers to determine if a burst write is possible. Also, bursting in the bridge function since it is external to the processor does not increase the performance of sequential writes internal to the processor.

Many existing software applications perform large sequential writes to memory. Graphics and multimedia applications that are constantly updating and manipulating screen data continually write large blocks of information to memory at sequential address locations. Word processing applications that manipulate alphanumeric character strings also perform large numbers of sequential memory writes using string operations. Loop, block move and move string instructions are instructions which often cause the processor to perform large numbers of sequential writes to memory. However, applications today are reaching bus bandwidth limitations due to the overhead of these memory writes.

String operations manipulate large data structures in memory. String instructions that write data to memory (either data cache or external memory) include the MOVS (Move String) and the STOS (Store String) from the x86 instruction set. The x86 instruction set is most commonly used in personal computers. To operate on more than one element of a string, repeat prefixes such as REP (repeat while the CX/ECX register is not zero), REPE/REPZ (repeat while the CX/ECX register not zero and the ZF flag is set), REPNE/REPNZ (repeat while the CX/ECX register not zero and the ZF flag is clear) are used in the x86 instruction set.

While using repeat prefixes is common practice in x86 software applications and makes the applications compact, the execution of these instructions in the processor is inefficient. Although the destination addresses for the data is typically sequential and the number of bytes to be transferred is large, the processor implements these instructions as single reads and writes to memory. When an instruction has a repeat prefix, the processor repeats the instruction as single operations until the termination condition is satisfied. Loop instructions may also create large sequential single writes to memory.

It would be desirable to have a computer system that optimally supported burst transfers that utilized existing software applications, existing computer board designs and existing bus bridges. In this way, large sequential writes to memory might be optimized into burst operations. System performance could be significantly improved with minimal cost and minimal upgrade time to the computer owner.

SUMMARY OF THE INVENTION

The present invention is an improvement to a processor in a personal computer that maximizes write performance utilizing existing software applications, existing computer boards, and existing bus bridges. The improvement is an automatic feature in a processor's microcode or instruction decoder/sequencer which provides a method for generating burst writes from multiple single write operations. The present invention decreases bus usage, thereby decreasing bus access times and significantly improving system performance.

Write operations suitable for forming into a burst write are preferably detected prior to execution. This occurs in a detection unit inside the processor's instruction decoder/sequencer. Write operations that meet specific conditions for quantity of data elements to be written and specific conditions for destination address are suitable for bursting. Once detected, the multiple data elements to be written are read from memory and are stored in a storage unit. A storage unit is used as a temporary buffer for collecting the data to be written as a burst operation. Stored data elements are written as a burst write operation by the processor's write unit. Using this invention, data may be written as a burst write operation to internal or external cache, or to external main memory.

The invention can be implemented in a new processor without requiring changes to existing software or computer board designs. The preferred embodiment of the invention is implemented in the microcode of the microprocessor with a hardware storage unit. Alternate embodiments may be implemented in hardware (logic circuitry) of the processor or combinations of microcode and hardware. The invention is an improvement over existing methods of bursting since it acts upon instructions as they are decoded internal to the processor.

A further understanding of the nature and advantages of the present invention may be realized by reference to the remaining portions of the specification and the drawings.

BRIEF DESCRIPTION OF THE DRAWINGS

So that the manner in which the above recited advantages and features of the present invention, as well as others which will become apparent, are attained and can be understood in detail, a more particular description of the invention summarized above may be had by reference to the embodiment thereof which is illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments.

DETAILED DESCRIPTION OF PREFERRED EMBODIMENTS

Figure 3:
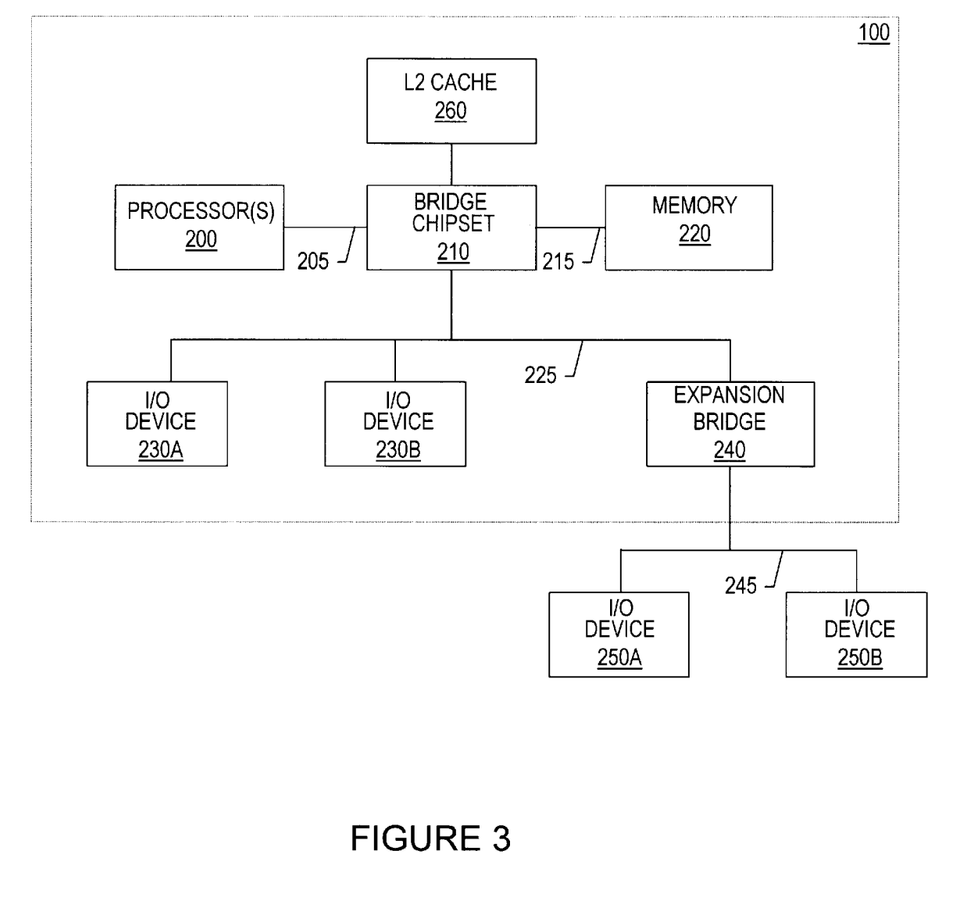
FIG. 3 is a diagram of a digital computer utilized by a preferred embodiment of the invention.

FIG. 3 is a diagram of a digital computer 100 utilized by a preferred embodiment of the invention. As shown, the computer includes processor(s) 200, also known as central processing unit (CPU), main or host processor, or microprocessor, which is coupled through a processor local bus 205 to a host/PCI/cache bridge or chipset 210. The chipset supports burst mode transfers by transferring existing burst operations from one bus to another. A second level or L2 cache memory 260 may be coupled to a cache controller in the chipset, as desired. The bridge or chipset 210 is coupled to main memory 220 through a memory bus 215. The main memory 220 is preferably DRAM (dynamic random access memory) or EDO (extended data out) memory, or other types of memory, as desired.

The chipset logic 210 includes a memory controller for interfacing to the main memory 220 and a cache controller for interfacing to the level two (L2) cache 260. The main processor 200 reads and writes data from main memory 220 through the bridge 210, caching frequently used data in the faster L2 cache 260.

The chipset logic 210 preferably includes various peripherals, including an interrupt system, a real time clock (RTC) and timers, a direct memory access (DMA) system, and ROM/Flash memory. Other peripherals are preferably included in the chipset 210, including communications ports, diagnostics ports, command/status registers, and nonvolatile static random access memory (NVSRAM).

The host/PCI/cache bridge or chipset 210 also interfaces to a local expansion bus or system bus 225. In the preferred embodiment, the local expansion bus 225 is the peripheral component interconnect (PCI) bus. However, it is noted that other local buses may be used, such as the VESA (Video Electronics Standards Association) local bus (VL bus). Various types of devices may be connected to the PCI bus 225.

One or more I/O (Input/Output) devices, 230A and 230B are coupled to the PCI bus 225. These devices 230A–230B may be any of various types of I/O devices, including multimedia devices and communication devices. For example, the devices 230A–230B may comprise video accelerator or graphics accelerator cards, network interface cards, SCSI adapters.

Expansion bus bridge logic 240 may also be coupled to the PCI bus 225. The expansion bus bridge logic 240 interfaces to an expansion bus 245 which may or may not be internal to digital computer 100. The expansion bus 245 may be any of varying types, including the industry standard architecture (ISA) bus, also referred to as the AT bus, the extended industry standard architecture (EISA) bus, or the microchannel architecture (MCA) bus. One or more I/O devices, 250A through 250B, may be coupled to the expansion bus 245, such as expansion bus memory, a modem, or various PCMCIA (Personal Computer Memory Card International Association) PC Cards.

Figure 4:
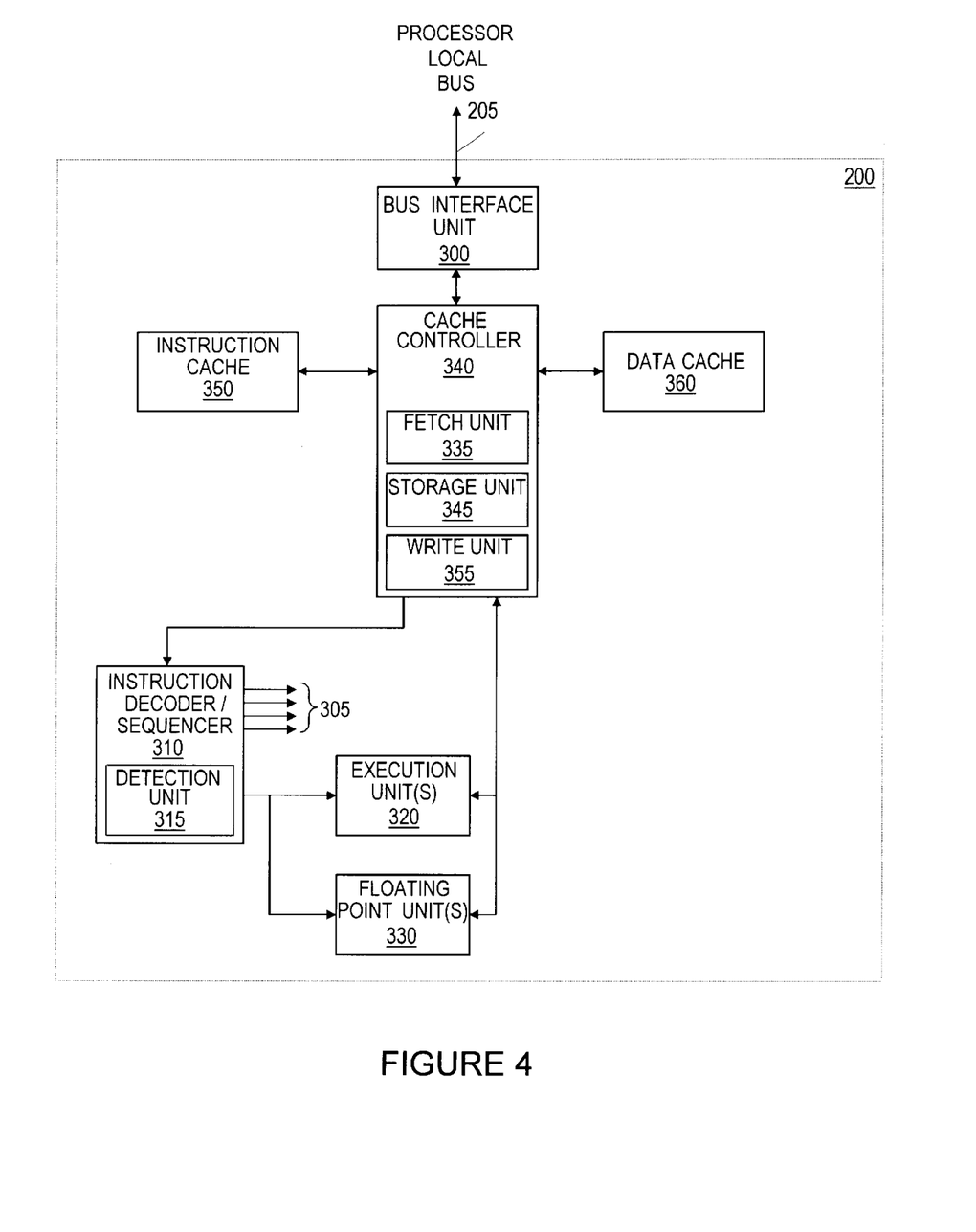
FIG. 4 is a general block diagram which depicts internal portions of processor unit 200 from FIG. 3.

FIG. 4 is a general block diagram depicting internal portions of processor unit 200 from FIG. 3. The processor includes a bus interface unit 300 which is coupled to an external processor local bus 205, made up typically of address, data, and control lines and which may support burst transfers. The bus interface unit 300 is coupled to cache memory controller 340. Controller 340 controls the accessing of the instruction cache memory 350 and data cache memory 360 (which may optionally be combined into one cache memory unit). Burst transfers are supported by the cache controller to/from the instruction and data caches as well as the bus interface unit. The instruction cache and data cache are filled from main memory 220 through the bus interface unit 300.

Coupled to the cache controller 340 is an instruction decoder/sequencer 310 in which instructions are parsed and microcode instructions are stored. The sequencer provides sequences of control signals 305 for the processor. Instructions are fetched or read from instruction cache 350 through the cache controller 340 by the fetch unit 335 and sent to the instruction decoder/sequencer 310. After being decoded and properly sequenced, instructions are sent to either the execution unit(s) 320 or the floating point unit(s) 330 for execution. In the execution of these instructions data is either read from the data cache 360 through the cache controller 340 or from external memory 220 through the bus interface unit 300. After execution data is written to either the data cache 360 or external memory 220.

In the present invention, as instructions are parsed, a detection unit 315 inside the instruction decoder/sequencer 310 detects multiple write instructions that are suitable for forming into a burst write operation. In present x86 architectures, for example, for multiple writes to be suitable for burst writes, the destination addresses of the data may be to not completely sequential address locations in memory, either increasing or decreasing; the destination address may be aligned on a cache line boundary; and the number of bytes to be written should be greater than or equal to a cache line size. For example, the PCI bus burst protocol currently allows two types of bursting: linear incrementing and cache line toggle mode. As shown later in this specification, decrementing addresses can be switched to incrementing. Also, not completely sequential addresses are addresses that are for the most part sequential, with a few skipped data bytes throughout the address range. Not completely sequential addresses are typically written to by not asserting byte enables for the skipped data on the PCI bus, creating sequential addressing. Multimedia applications which manipulate large blocks of memory for screen writes or instructions such as a REP MOVS (repeat move string) instruction are examples of common occurrences of suitable multiple writes for forming a burst write operation.

In x86 architecture, caches are organized by lines or groups of bytes that can be accessed in one operation. Cache line size refers to the number of bytes in that line, typically 16, 32 or 64 bytes. A cache line boundary refers to the addresses of the first and last bytes in the line, which are aligned on 16, 32 or 64 byte boundaries. For example, for a 16 byte cache line size, the four least significant bits of the boundary addresses will end in 0(hex) or F(hex).

Once suitable multiple write operations are detected, the sequencer 310 sends out a sequence of controls to instruct the fetch unit 335 to fetch or read data elements from memory. Data elements are read as single reads, continuing reads until enough data is read to form a burst write. The sequencer 310 keeps count of the number of bytes to be written as a burst, stopping when enough bytes have been fetched or read from memory. If an operation is needed on the data, for example, an addition or multiplication by a constant, the operation is performed on the data by one of the execution units 320 or by one of the floating point units 330. The data elements are collected in storage unit 345 in the cache controller 340. The storage unit is a temporary buffer for collecting the data to be written as a burst operation. The storage unit may be a small register file for specific or generic use. The location of storage unit 345 is implementation dependent and not important to the disclosure of the invention. Once all of the data is collected, the data is written as a burst operation either to data cache 360 or external memory 220 by a write unit 355 in the cache controller 340.

Figure 5:
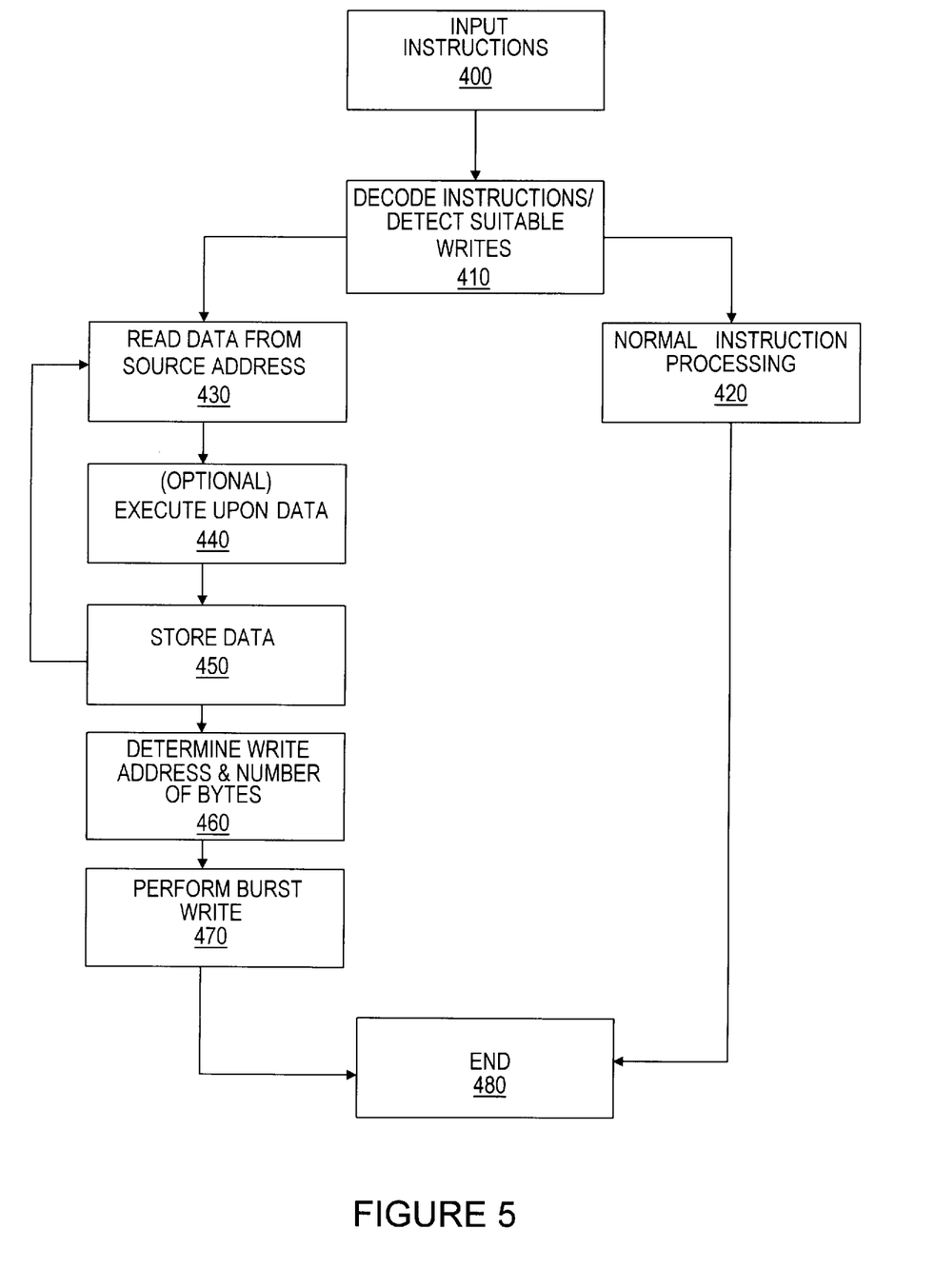
FIG. 5 is a flowchart diagram illustrating the preferred method of optimizing multiple write operations into a burst write operation.

Referring now to FIG. 5, a flowchart diagram illustrating the preferred method of optimizing multiple write operations into a burst write operation is shown. An instruction stream 400 is input into the system. The instruction stream contains multiple instructions including operations such as read, write, add, multiply, etc. Some instructions are complex and can be broken down into multiple simpler operations. For example, a repeat add instruction can be broken down into multiple single add operations. The instructions are parsed and decoded in step 410. Here, multiple write instructions and multiple write operations suitable for burst writes are detected and sent on to step 430. Detection of multiple write instructions and multiple write operations suitable for burst has previously been described. All instructions and operations that are not suitable for forming into burst writes get passed on to step 420 for normal processing.

In step 430, the data to be written is read from memory. Data is read from a source address in memory, either from the internal processor data cache, external cache or from external main memory. In step 440, the data is optionally executed on. If an operation is needed on the data, for example, addition or multiplication by a constant, the operation is performed on the data in the execution step 440. In step 450, the data to be written is stored. Steps 430 through 450 are repeated until enough data is collected to perform a burst write. In step 460 the details of the burst write, such as destination address and number of data bytes to be written are determined. The size and beginning destination address is determined by the particular bus protocol. For example, burst writes to cache memory must be the size (number of bytes) of a cache line and aligned on a cache line boundary. The destination address is usually the lowest address to be written so that the burst will be in increasing address order. The number of bytes is determined by utilizing a counter while fetching the data from memory. In step 470, the data is burst written. Processing is complete in step 480.

Figure 6:
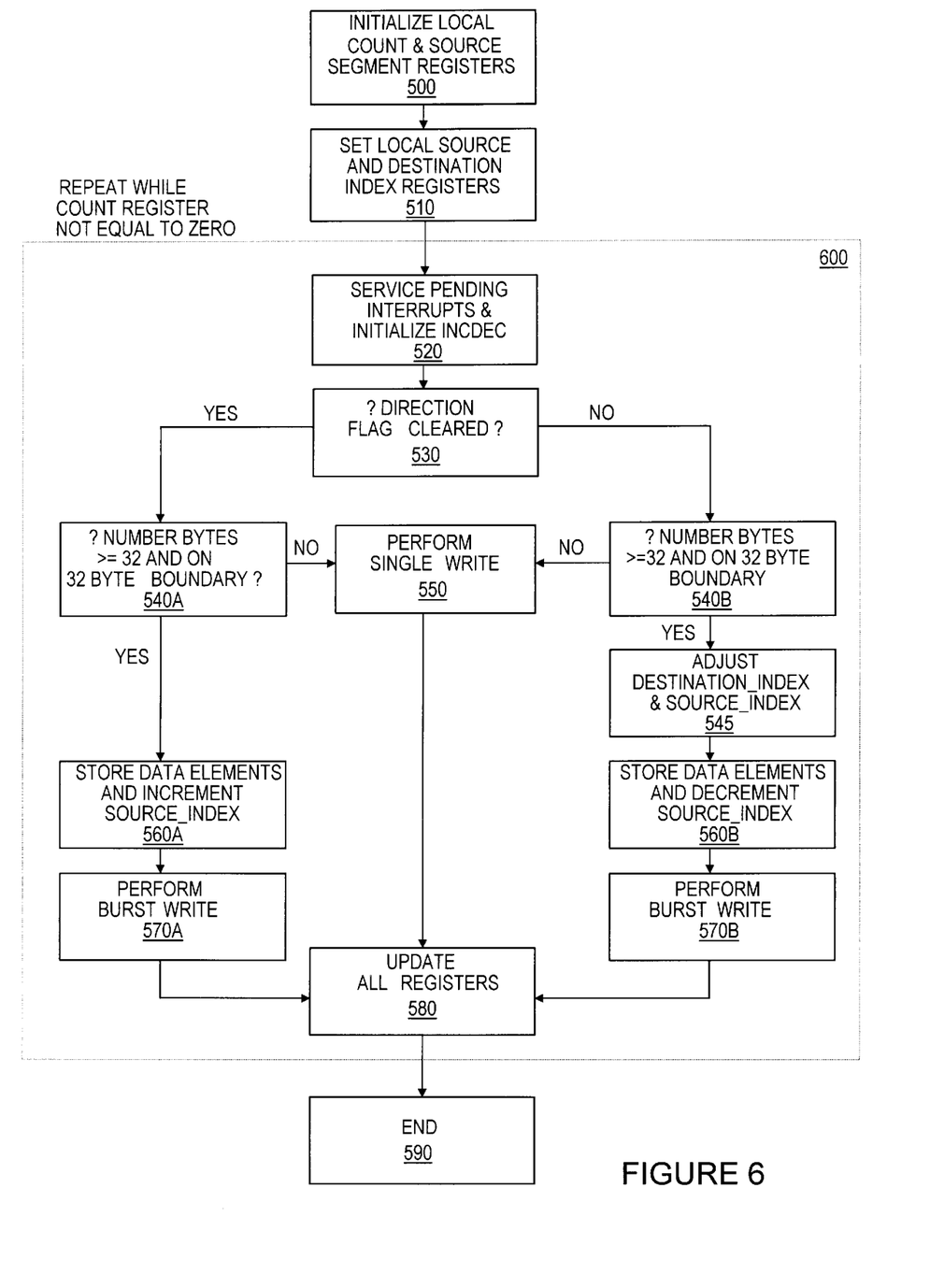
FIG. 6 is a flowchart diagram illustrating an example of the method of optimizing multiple write operations generated by a REP MOVS instruction into a burst write operation.

Referring now to FIG. 6, a flowchart diagram illustrating an example of the method of optimizing multiple write operations generated by a REP MOVS instruction into a burst write operation is shown. The REP MOVS instruction is from the x86 architecture instruction. In this example, the cache line size is 32 bytes. It will be apparent to those of ordinary skill the alternate implementations of this invention using different repeat prefixes, different instructions, different cache line sizes and different bus burst characteristics. The present invention is preferably implemented in the microcode of a processor. Table 1 includes an example of pseudo code (high level description code) for the microcode of a processor implementing the present invention, applied to the REP MOVS instruction.

String instructions of the x86 architecture instruction set require the use of two specific registers. The source and destination strings are in memory addressed by the SI (Source Index) and DI (Destination Index) registers for address size of 16 (alternately referred to as 16 bit code) or ESI (Extended Source Index) and EDI (Extended Destination Index) registers for address size of 32 (alternately referred to as 32 bit code). By default, the SI (ESI) register is used with the DS segment register noted as DS:SI (DS:ESI) and points to source operands. A segment override prefix allows the SI (ESI) register to be used with the CS, SS, ES, FS, or GS segment registers to point to source operands. Segment prefix overrides are noted as CS:SI (CS:ESI), SS:SI (SS:ESI), etc. The DI (EDI) register uses the segment indicated by the ES segment register noted as ES:DI (ES:EDI) to point to destination location; no segment override is allowed.

When SI (ESI) and DI (EDI) are used in string instructions, they are incremented or decremented after each iteration by the microcode in a processor. String operations can begin at higher addresses and work toward lower ones, or they can begin at lower addresses and work toward higher ones. The direction is controlled by the DF flag. If the flag is clear, the registers are incremented. If the flag is set, the registers are decremented.

The flowchart diagram of FIG. 6 illustrates multiple write instructions optimized into a burst write operation according to this embodiment of the present invention. The processing begins with step 500, initializing local variables or registers of the count and source segment registers. These local registers are set up to keep track of current iteration and addresses for the REP instruction. For a REP prefix instruction in the x86 architecture, the count register holds the number of times the instruction is to be repeated. If the address size is 16, the local count register (COUNTREG) is initialized to the value in CX. Otherwise, the address size is 32 and the local count register (COUNTREG) is initialized to the value in ECX. As shown below in pseudo code, the local source segment register (SSEG) is initialized to the value in DS unless the segment prefix override is set. If it is set, SSEG is initialized to the value in the prefix segment register (CS, SS, ES, FS or GS).

```
IF segment_prefix_override      ;if segment prefix override is set
THEN SSEG = prefix_segment      ;SSEG is set to one of CS, SS, ES, FS, GS
ELSE SSEG = DS
ENDIF
```

As shown below, in the next step 510, the local source index register (source_index) and the local destination index register (destination_index) are set depending on address size. If the address size is 16, source_index is set to the value of the source segment register offset by the value of SI (SSEG:SI) and destination_index is set to the value of register ES offset by the value of DI (ES:DI). Otherwise, the address size is 32 and the source address is set to the source segment register offset by the value of ESI (SSEG:ESI) and the destination address is set to the value of ES offset by the value of EDI (ES:EDI).

```
IF AddressSize = 16
  THEN source_index = SSEG:SI
       destination_index = ES:DI
```

```
  ELSE source_index = SSEG:ESI
       destination_index = ES:EDI
ENDIF
```

Steps outlined by box 600 are repeated while COUNTREG is not equal to zero.

Beginning with step 520, all pending interrupts are serviced. Interrupts are effectively disabled in microcode by not servicing them again completion of all steps or looping back to step 520. Servicing interrupts causes the processor to temporarily suspend the application being run in order to run an application of higher priority. Typically, the operating system, monitor or device driver handles them, first saving the current state of all x86 architecture defined registers including a pointer to the next instruction to be executed. Transfer of execution does not take place until the end of the current instruction. In normal processing of instruction code, if the instruction has a repeat prefix, transfer takes place at the end of the current iteration with registers set to execute the next iteration. In this embodiment of the present invention, interrupts are disabled for steps 520 through 580 in order to preserve the current state of the application and values of local registers due to normal interrupt processing. By not servicing interrupts during steps 520 through 580, cache and data consistency are maintained. After each repetition of Steps 520–580, interrupts are serviced. This mechanism allows long string operations to proceed without affecting the interrupt response time of the system.

Also in step 520, a local variable register, INCDEC, is initialized to zero. INCDEC is used for keeping track of the number of bytes to be written, either in a burst write or a single write operation.

In step 530 the direction flag (DF) is checked to see if it is set or cleared. The DF controls the direction the string is operated on, either from higher addresses to lower if the flag is set or from lower addresses to higher if the flag is cleared. If the direction flag is cleared, the processing continues to step 540A. If the direction flag is set, the processing continues to step 540B.

In step 540A, COUNTREG is checked to see if 32 or more bytes need to be transferred. In this example, the cache line size is 32 bytes and therefore, the optimum number of bytes to create a burst write operation. If the instruction is a byte instruction, for example, RepMovStringByte (REP MOVS Byte), COUNTREG is checked to be greater than or equal to 32. If the instruction is a word instruction, for example, RepMoveStringWord (REP MOVS Word), COUNTREG is checked to be greater than or equal to 16. If the instruction is a doubleword instruction, for example, RepMove StringDWord (REP MOVS DWord), COUNTREG is checked to be greater than or equal to 8. Also in step 540A, destination_index is checked to be on a 32-byte line boundary. The last five bits of destination_index [4:0] are checked to equal zero, indicating a 32 byte line boundary. If both the transfer is greater than (or equal to) 32 bytes and destination_index is on a 32 byte line boundary, a burst write can be performed and processing continues to step 560A. If not, a single write is performed in step 550.

In step 550, to perform a single write, the data elements (byte, word or doubleword based on instruction type) are read from the address indicated by source_index and written to the address indicated by destination_index. Next, INCDEC is set to one. If the direction flag is set, both source_index and destination_index are incremented by one for a byte instruction, by two for a word instruction and by four for a doubleword instruction. If the direction flag is cleared, both source_index and destination_index are decremented by one for a byte instruction, by two for a word instruction and by four for a doubleword instruction. Processing continues to step 580.

Continuing with Step 560A from step 540A, this step is repeated four times to create a burst write of four 64 bit writes (for a cache line size of 32 bytes). In this step data elements are loaded or read according to source_index and stored into the storage unit 345. INCDEC is incremented by eight, four, or two if the instruction is byte, word or doubleword accordingly. Source_index is incremented by eight.

A burst write is performed in step 570A. The data elements in the storage unit are written to the address indicated by destination_index as a burst write. Destination_index is then incremented by 32.

Returning to step 530, when the direction flag is not cleared the processing continues to step 540B. In step 540B, COUNTREG is checked to see if 32 or more bytes need to be transferred. If the instruction is a byte instruction, for example, RepMovStringByte, COUNTREG is checked to be greater than or equal to 32. If the instruction is a word instruction, for example, RepMoveStringWord, COUNTREG is checked to be greater than or equal to 16. If the instruction is a doubleword instruction, for example, RepMove StringDWord, COUNTREG is checked to be greater than or equal to eight. Also in step 540B, destination_index is checked to be on a 32-byte line boundary. The last five bits of destination_index [4:0] are checked to equal 31 (or 1F hex) for a byte instruction; equal to 30 (1E hex) for a word instruction; or equal to 28 (1C hex) for a doubleword instruction, indicating a 32 byte line boundary. If both the transfer is greater than (or equal to) 32 bytes and destination_index is on a 32 byte line boundary, a burst write can be performed and processing continues to step 560B. If not, a single write is performed in step 550 (see description of step 550 above).

Continuing with step 545B from step 540B, destination_index and source_index are adjusted to perform the burst write in the increasing direction. Destination_index and source_index are decremented by 31, 30 or 28 for byte, word or doubleword instructions accordingly. Processing continues to step 560B.

Step 560B is repeated four times to create a burst write of four 64 bit writes. Data elements are fetched according to source_index and stored into the storage unit 345. INCDEC is incremented by eight, four, or two if the instruction is byte, word or doubleword accordingly. Source_index is incremented by eight.

A burst write is performed in step 570B. The data elements in the buffer are written to the address indicated by destination_index as a burst write. Destination_index and source_index are readjusted. Destination_index is decremented by one, two or four for byte, word or doubleword instructions accordingly. Source_index is then decremented by 32. Processing continues to step 580.

Step 580 is performed after step 570A for an incrementing burst write, after step 570B for a decrementing burst write and after step 550 for a single write. COUNTREG (CX or ECX) is decremented by the value of INCDEC. All x86 architecture registers are also updated, for example, DI (EDI) is set to the value of destination_index, SI (ESI) is set to the value of source_index. Processing continues with step 520 until COUNTREG (CX or ECX) is equal to zero.

When COUNTREG is equal to zero, step 590, processing of the REP instruction is done.

Another embodiment of the invention may be utilized with other instructions such as the loop instruction. For example, referring to the following pseudo code, a loop instruction generates 60 sequential single writes to memory.

```
LOOP 60 times {
    READ X from address Y
    X = X*30
    WRITE X to address Z
    Y = Y + 1
    Z = Z + 1 }
END LOOP
```

In the above example, data is read from address Y, executed on (multiplication by 30), and written to address Z. As the loop iterates, data is read from offsets to address Y, and written to offsets from Z, creating multiple sequential single writes to memory. To create burst writes from the multiple sequential single writes, the detection unit 315 of FIG. 4 determines if the single writes are suitable for a burst write to memory. For example, for burst protocol to a data cache, the detection unit 315 determines if the number of bytes to be written is greater than or equal to a cache line size, and determines if Z (or the destination address) is aligned on a cache line boundary. If both conditions are met, the loop is executed enough times for a burst write. If both conditions are not met, the loop is executed once and the detection unit 315 checks the conditions for burst write again.

Another embodiment of the present invention is performed by decoding enough instructions prior to their execution in the instruction decoder/sequencer and detecting a number of sequential writes suitable for burst writes.

Whereas the preferred embodiment of the invention is implemented in the microcode of a processor with a hardware storage unit, it should be apparent to those of ordinary skill in the art other implementations in hardware (logic functionality) or combinations of both hardware and microcode. For example, the detection unit could be implemented in hardware. The detection unit 315 may be comprised of comparators. A comparator may determine if the number of bytes to be written is greater than or equal to a cache line size. Another comparator may determine if the destination address is aligned on a cache line boundary. If both conditions are met, a signal may be sent to the instruction decoder/sequencer 310 to trigger the formation of a burst write.

The present invention increases the system performance of a personal computer by reducing the overall bus usage by the processor without the costly investments of new computer board designs and new software applications. Increased available bus bandwidth is achieved by combining single write operations into burst write operations. Increasing available bus bandwidth decreases bus access time thereby increasing system performance. This performance improvement is achieved both internal to the processor and external on the busses of the computer board. The internal improvement occurs during writes to the internal data cache.

The external improvement occurs during writes to external caches or memory.

The present invention has many advantages over the existing methods of bursting. Since the invention is a modification to the internals of the processor and uses the existing bus interface, the present invention requires no change in the existing personal computer infrastructure, including operating and application software, software compilers, and computer board designs. A processor replacement is all that is required for the average computer user to take advantage of the new invention. This eliminates costly board redesigns, and expensive and time consuming software rewrites and recompiles.

The invention is an improvement over existing processor's methods of bursting since it acts upon instructions as they are executing. Existing processors perform bursts only during cache coherency operations which are not a function of instruction processing. Due to this, programmers cannot take advantage of burst capabilities for applications that require moving large blocks of data and many memory write operations. This invention allows existing applications to access burst capabilities without rewriting the software application. Bus bridges that perform bursts either transfer existing burst operations from one bus to another or combine single operations into bursts, but only after the instructions have executed. This is an inefficient method of bursting since all data must be buffered and stored before determining if a burst can be performed. The invention identifies single write instructions that can be burst while the instructions are being parsed and executes them as a burst write operation.

Although the present invention has been fully described above with reference to specific embodiments, other alternative embodiments will be apparent to those of ordinary skill in the art. Therefore, the above description should not be taken as limiting the scope of the present invention which is defined by the appended claims.

TABLE 1

(C) Copyright Advanced Micro Devices 1996 All Rights reserved.
Pseudo code of Microcode Instructions, Specifically for:
REP MOVS r8,r8; REP MOVS r16,r16 ; REP MOVS r32,r32 Instructions

```
; Set count register variable determined by address size 16 or 32-bit
    IF AddressSize=16,
    THEN CountReg=CX
    ELSE CountReg=ECX
    ENDIF
; Set source segment register equal to DS unless segment prefix override
    IF segment_prefix_override,
    THEN sseg = prefix_segment
    ELSE sseg = DS
    ENDIF
; Set source and destination index depending on address size.
    IF AddressSize=16
    THEN source_index=sseg:SI
        destination_index=ES:DI
    ELSE source_index=sseg:ESI
        destination_index=ES:EDI
    ENDIF
; Determine operand size for data transfer for CountReg decrement value
    IF instruction = REP MOVS r8,r8
    THEN GoTo RepMovStringByte
    ELSE IF instruction = REP MOVS r32,r32
        THEN GoTo RepMovStringBig
        ELSE GoTo RepMovStringWord
        ENDIF
    ENDIF
MACRO RepMovStringByte
    WHILE CountReg<>0
    DO {   service pending interrupts
    ; CountReg value of 32 = 1 line*; Burst writes must be on 32-byte line boundaries.
    ;   (*Only A transfer count of 32-byte lines meets burst requirements*)
        IncDec = 0    ; Clear register adjust value
; Direction Flag and bits 4..0 of destination determine if burst write can be performed
    IF DF=0
    THEN IF CountReg >= 32 *AND* destination_index[4:0]=0,
; Perform burst write in increasing direction, four 64-bit writes
        THEN DO 4 times    { [prestore] = [source_index] ; Quad-byte
; assignment
                IncDec = IncDec + 8
                source_index = source_index + 8 } ; end of DO loop
                [destination_index] = [prestore] ; perform burst write
                destination_index = destination_index + 32
        ELSE
; Perform single byte writes
                [destination_index] = [source_index] ; byte assignment
                IncDec = 1
                destination_index = destination_index + IncDec
                source_index = source_index + IncDec
        ENDIF
    ELSE ; DF = 1
        IF CountReg>=32 *AND* destination_index[4:0] = 31
; Adjust destination and source, then perform burst write in increasing direction
        THEN destination_index = destination_index -31
```

TABLE 1-continued

```
                    source_index = source_index − 31
                DO 4 times        {
                    [prestore] = [source_index] ; Quad-byte assignment
                    source_index = source_index + 8
                    IncDec = IncDec + 8        }
                [destination_index] = [prestore] ; perform burst write of line
;       Then re-adjust destination and source
                    destination_index = destination_index − 1
                    source_index = source_index − 32
            ELSE
; Perform single byte writes DF=1 in decreasing direction
                    [destination_index] = [source_index] ; byte assignment
                    IncDec = 1
                    destination_index = destination_index − IncDec
                    source_index = source_index − IncDec
            ENDIF
; Update Count for all cases
        CountReg = CountReg − IncDec
}
MACRO RepMovStringWord
    WHILE CountReg<>0
    DO {      service pending interrupts
; CountReg value of 16 = 1 line*; Burst writes must be on 32-byte line boundaries.
;  (*Only A transfer count of 32-byte lines meets burst requirements*)
    IncDec = 0    ; Clear register adjust value
; Direction Flag and bits 4..0 of destination determine if burst write can be performed
    IF DF=0
        THEN IF CountReg >= 16 *AND* destination_index[4:0]=0,
; Perform burst write in increasing direction, four 64-bit writes
            THEN DO 4 times { [prestore] = [source_index] ; Quad-byte
; assignment
                    IncDec = IncDec + 4
                    source_index = source_index + 8} ; end of DO loop
                    [destination_index] = [prestore] ; perform burst write
                    destination_index = destination_index + 32
            ELSE
; Perform single word writes
                    [destination_index] = [source_index] ; byte assignment
                    IncDec = 1
                    destination_index = destination_index + 2
                    source_index = source_index + 2
            ENDIF
    ELSE ; DF = 1
            IF CountReg >=16 *AND* destination_index[4:0] = 30
; Adjust destination and source, then perform burst write in increasing direction
            THEN    destination_index = destination_index − 30
                    source_index = source_index − 30
                    DO 4 times { [prestore] = [source_index] ; Quad-byte
; assignment
                        source_index = source_index + 8
                        IncDec = IncDec + 4      }
                    [destination_index] = [prestore] ; perform burst write of line
;       Then re-adjust destination and source
                    destination_index = destination_index − 2
                    source_index = source_index − 32
            ELSE
; Perform single word writes
                    [destination_index] = [source_index] ; byte assignment
                    IncDec = 1
                    destination_index = destination_index − 2
                    source_index = source_index − 2
            ENDIF
; Update Count for all cases
        CountReg = CountReg − IncDec
}
MACRO RepMovStringBig
    WHILE CountReg<>0
    DO {      service pending interrupts
; CountReg value of 8 = 1 line*; Burst writes must be on 32-byte line boundaries.
;  (*Only A transfer count of 32-byte lines meets burst requirements*)
    IncDec = 0    ; Clear register adjust value
; Direction Flag and bits 4..0 of destination determine if burst write can be performed
    IF DF=0
        THEN IF CountReg >= 8 *AND* destination_index[4:0]=0,
; Perform burst write in increasing direction, four 64-bit writes
            THEN DO 4 times { [prestore] = [source_index] ; Quad-byte
; assignment
                    IncDec = IncDec + 2
                    source_index = source_index + 8} ; end of DO loop
```

TABLE 1-continued

```
                [destination_index] = [prestore] ; perform burst write
                destination index = destination_index + 32
        ELSE
; Perform single dword writes
                [destination_index] = [source_index] ; byte assignment
                IncDec = 1
                destination_index = destination_index + 4
                source_index = source_index + 4
        ENDIF
    ELSE ; DF = 1
        IF CountReg >= 8 *AND* destination_index[4:0] = 28
; Adjust destination and source, then perform burst write in increasing direction
        THEN    destination_index = destination_index - 28
                source_index = source_index - 28
                DO 4 times { [prestore] = [source_index] ; quad-byte
; assignment
                    source_index = source_index + 8
                    IncDec = IncDec + 2      }
                [destination_index] = [prestore] ; perform burst write of line
;       Then re-adjust destination and source
                destination_index = destination_index - 4
                source_index = source_index - 32
        ELSE
; Perform single dword writes
                [destination_index] = [source_index] ; byte assignment
                IncDec = 1
                destination_index = destination_index - 4
                source_index = source_index - 4
        ENDIF
; Update Count for all cases
    CountReg = CountReg - IncDec
}
```

What is claimed is:

1. A method of writing a plurality of data elements to a memory comprising the steps of:
    (a) detecting in an instruction stream one or more instructions, said one or more instructions capable of generating a plurality of single write cycles and said one or more instructions being detected prior to generating said plurality of single write cycles, each detected instruction being associated with at least one data element and at least one destination address;
    (b) collecting in a storage unit said data elements associated with said detected instructions; and
    (c) writing said collected data elements to a burst destination address in a burst write cycle, wherein said step of writing in a burst write cycle includes transmitting a single burst destination address in a first time frame and said data elements to memory in multiple subsequent time frames.

2. The method of claim 1, wherein said step of detecting in an instruction stream one or more instructions, said one or more instructions capable of generating a plurality of single write cycles and said one or more instructions being detected prior to generating said plurality of single write cycles comprises detecting a plurality of destination addresses associated to said detected instructions wherein said destination addresses are to sequential locations in memory.

3. The method of claim 1, wherein said step of detecting in an instruction stream one or more instructions, said one or more instructions capable of generating a plurality of single write cycles and said one or more instructions being detected prior to generating said plurality of single write cycles comprises detecting said plurality of destination addresses wherein the first address is aligned on a cache line boundary.

4. The method of claim 1, wherein said step of detecting in an instruction stream one or more instructions, said one or more instructions capable of generating a plurality of single write cycles and said one or more instructions being detected prior to generating said plurality of single write cycles comprises detecting said data elements which are equal in count to the number of bytes in a cache line size.

5. The method of claim 1, further comprising the step of calculating a burst destination address prior to writing said collected plurality of data elements to said burst destination address in a burst write cycle.

6. The method of claim 5, wherein said step of calculating a burst destination address includes identifying the lowest destination address to memory which is also aligned on a cache line boundary by adjusting said associated destination address for ascending and descending writes and byte, word and d-word writes.

7. The method of claim 1, further comprising sending said data elements to an execution unit for performing a mathematical calculation prior to being collected in said storage unit.

8. A function in a processor for writing a plurality of data elements to a memory comprising:
    (a) a detection unit for detecting in an instruction stream one or more instructions, said one or more instructions capable of generating a plurality of single write cycles and said one or more instructions being detected prior to generating said plurality of single write cycles, each detected instruction being associated with at least one data element and at least one destination address;
    (b) a fetch unit in a processor for reading said data elements;
    (c) a storage unit for collecting said data elements; and
    (d) a write unit for writing said collected data elements in a burst write cycle, wherein said burst write cycle includes transmitting a single burst destination address in a single time frame and said data elements to memory in multiple subsequent time frames.

9. The apparatus of claim 8, wherein said detection unit includes apparatus for detecting a plurality of destination addresses associated to said detected instructions wherein said destination addresses are to sequential locations in memory.

10. The apparatus of claim 8, wherein said detection unit includes apparatus for detecting said plurality of destination addresses wherein a first address is aligned on a cache line boundary.

11. The apparatus of claim 8, wherein said detection unit includes apparatus for detecting said data elements which are equal in count to the number of bytes in a cache line size.

12. The apparatus of claim 8 further comprises an execution unit for performing a mathematical calculation prior to collecting said data elements in said storage unit.

13. A computer system, including an apparatus for burst transferring data, said system comprising:
   (a) a memory for storing data and instructions;
   (b) a processor coupled to said memory by a bus, said processor comprising:
      (i) an execution unit for executing said instructions stored in said memory;
      (ii) a detection unit for detecting in an instruction stream one or more instructions, said one or more instructions capable of generating a plurality of single write cycles and said one or more instructions being detected prior to generating said plurality of single write cycles, each detected instruction being associated with at least one data element and at least one destination address;
      (iii) a fetch unit for fetching said data elements; and
      (iv) a write unit for writing said fetched data elements in a burst write cycle, wherein said burst write cycle includes transmitting a single burst destination address in a single time frame and said data elements to memory in multiple subsequent time frames.

14. The system of claim 13, wherein said detection unit includes apparatus for detecting a plurality of destination addresses associated to said detected instructions wherein said destination addresses are to sequential locations in memory.

15. The system of claim 13, wherein said detection unit includes apparatus for detecting a plurality of destination addresses wherein a first address is aligned on a cache line boundary.

16. The system of claim 13, wherein said detection unit includes apparatus for detecting said data elements which are equal in count to the number of bytes in a cache line size.

17. The system of claim 13 wherein said execution unit performs a mathematical calculation prior to being collected in said storage unit.

* * * * *